(12) United States Patent
Kuenzel et al.

(10) Patent No.: US 6,408,737 B1
(45) Date of Patent: Jun. 25, 2002

(54) CONTROL METHOD FOR A HYDRAULIC DRIVE, AND A CONTROL DEVICE CORRESPONDING THERETO

(75) Inventors: Stefan Kuenzel, Erlangen; Thomas Grohmann, Poxdorf, both of (DE)

(73) Assignee: Siemens Aktiengesellschaft, Munich (DE)

( * ) Notice: Subject to any disclaimer, the term of this patent is extended or adjusted under 35 U.S.C. 154(b) by 30 days.

(21) Appl. No.: 09/693,743

(22) Filed: Oct. 20, 2000

(30) Foreign Application Priority Data

Oct. 29, 1999 (DE) .......................... 199 52 266

(51) Int. Cl.⁷ .................................. F15B 9/03
(52) U.S. Cl. ....................................... 91/363 R
(58) Field of Search ................. 91/363 R, 361, 91/433

(56) References Cited

U.S. PATENT DOCUMENTS 5,570,621 A * 11/1996 Kabasin ................. 91/363 R

* cited by examiner

Primary Examiner—Edward K. Look
Assistant Examiner—Michael Leslie
(74) Attorney, Agent, or Firm—Kenyon & Kenyon

(57) ABSTRACT

A position control branch for a hydraulic drive is prescribed a desired position. The hydraulic drive is moved to an actual position via the position control branch. It is determined whether the hydraulic drive has come to a standstill. On detection of a standstill, a desired direction of movement is determined with the aid of the actual position and the desired position. A force value dependent on the desired direction of movement is then applied to the hydraulic drive via a force precontroller connected in parallel with the position control branch.

26 Claims, 4 Drawing Sheets

CONTROL METHOD FOR A HYDRAULIC DRIVE, AND A CONTROL DEVICE CORRESPONDING THERETO

FIELD OF THE INVENTION

The present invention relates to a control method for a hydraulic drive which is moved via a control branch, and to a control device corresponding thereto.

BACKGROUND INFORMATION

In general, a high pressure is applied to a hydraulic drive. Because of the cylinder rod seals, moving the drive therefore necessitates over-coming a high friction force which is always directed against the direction of movement. When the hydraulic drive changes its direction of movement, the force value applied to the hydraulic drive must be changed by twice the friction force. This lasts a certain time. The hydraulic drive is stationary during this time interval.

The control branch has at least one position controller, sometimes with a subordinate speed controller, but sometimes also only a speed controller. The controllers frequently have an integral-action component. Any integral-action component possibly present assumes a relatively large value during the standstill of the hydraulic drive.

Particularly in the case of a position controller, there is also the risk that the hydraulic drive will overshoot when approaching a new desired position. The hydraulic drive must then be moved back in the opposite direction. There is then the risk during approach of renewed overshooting, this time in the opposite direction of movement. It is therefore difficult to approach a desired position accurately. Consequently, for the purpose of avoiding a permanent oscillation of the hydraulic drive about its desired position a dead zone of the integral-action component is frequently introduced in the prior art. Thus, a system deviation—albeit a slight one—is tolerated. A PT1 element used instead of the integral-action component also acts similarly: by virtue of the fact that there must be a desired/actual deviation in order to generate a non-vanishing signal at the controller output, a system deviation is tolerated here, as well.

SUMMARY

It is an object of the present invention to provide a control method for a hydraulic drive, and a control device corresponding thereto, by means of which the time interval during which the hydraulic drive is stationary can be reduced. Furthermore, it is to be possible to approach a desired position more accurately in the case of a position controller.

This object is achieved of the control method by virtue of the fact that it is determined whether the hydraulic drive has come to a standstill, and that, on detection of a standstill, a force value dependent on the desired direction of movement is applied to the hydraulic drive via a force precontroller connected in parallel with the control branch as a function of the desired direction of movement.

In a version corresponding to this, the object of the control device is achieved by virtue of the fact that it has a standstill determiner for determining a standstill of the hydraulic drive, that connected in parallel with the control branch is a force precontroller which can be fed an output signal of the standstill determiner and a desired direction of movement, and that upon detection of a standstill a force value dependent on the desired direction of movement can be applied to the hydraulic drive by means of the force precontroller.

It is particularly advantageous to apply the present invention when the control branch is prescribed a desired position and an actual position, the hydraulic drive is moved via the control branch under positional control, and the desired direction of movement is determined with the aid of the actual position and the desired position.

It is possible, for example, to determine a standstill of the hydraulic drive by virtue of the fact that an actual speed is compared with a threshold speed and standstill is detected when the absolute value of the actual speed undershoots the threshold speed.

The position control branch can be deactivated while the force value dependent on the desired direction of movement is being applied to the hydraulic drive. Alternatively, it is possible that the position control branch remains activated while the force value dependent on the desired direction of movement is being applied to the hydraulic drive.

The force value dependent on the desired direction of movement can be applied to the hydraulic drive via a force controller. Alternatively, it is possible that valve slide desired-position pulses dependent on the desired direction of movement are applied to the hydraulic drive via a pulse generator until the force value dependent on the desired direction of movement is reached.

In the case of a controlled force precontroller, it is possible to compensate a position-dependent reaction of the hydraulic drive to being driven by virtue of the fact that the force controller is fed the actual position, and the force controller amplifies a difference between a desired force value and an actual force value as a function of the actual position. In the case of a controlled application of the force value dependent on the desired direction of movement, in a similar way the actual position is fed to the pulse generator, and the pulse generator determines the valve slide desired-position pulses as a function of the actual position.

If the force controller has a force controller integral-action component and the force controller integral-action component is held or reset when the force controller is deactivated, the precontroller response is optimized when the force precontroller is regulated. In the case of controlled prescription of the force value, the precontrol can be optimized by virtue of the fact that the pulse generator simulates the force value via a force model.

The force value dependent on the desired direction of movement is preferably determined from a load force and a friction force.

If there is a risk of overshooting of the hydraulic drive because of the force precontroller, it is nevertheless possible to approach a desired position accurately when the difference between the force value-dependent on the desired direction of movement and the load force is less than the friction force. The force controller is therefore switched off before the friction force is reached. However, because of the control response hydraulic liquid still flows into the hydraulic drive, with the result that the friction force is built up in its entirety.

If the position control branch has a position control branch integral-action component and the control branch integral-action component is held or reset when the force precontroller is activated, there is no renewed risk of overshooting upon reactivation of the position control branch.

DETAILED DESCRIPTION

Figure 1:
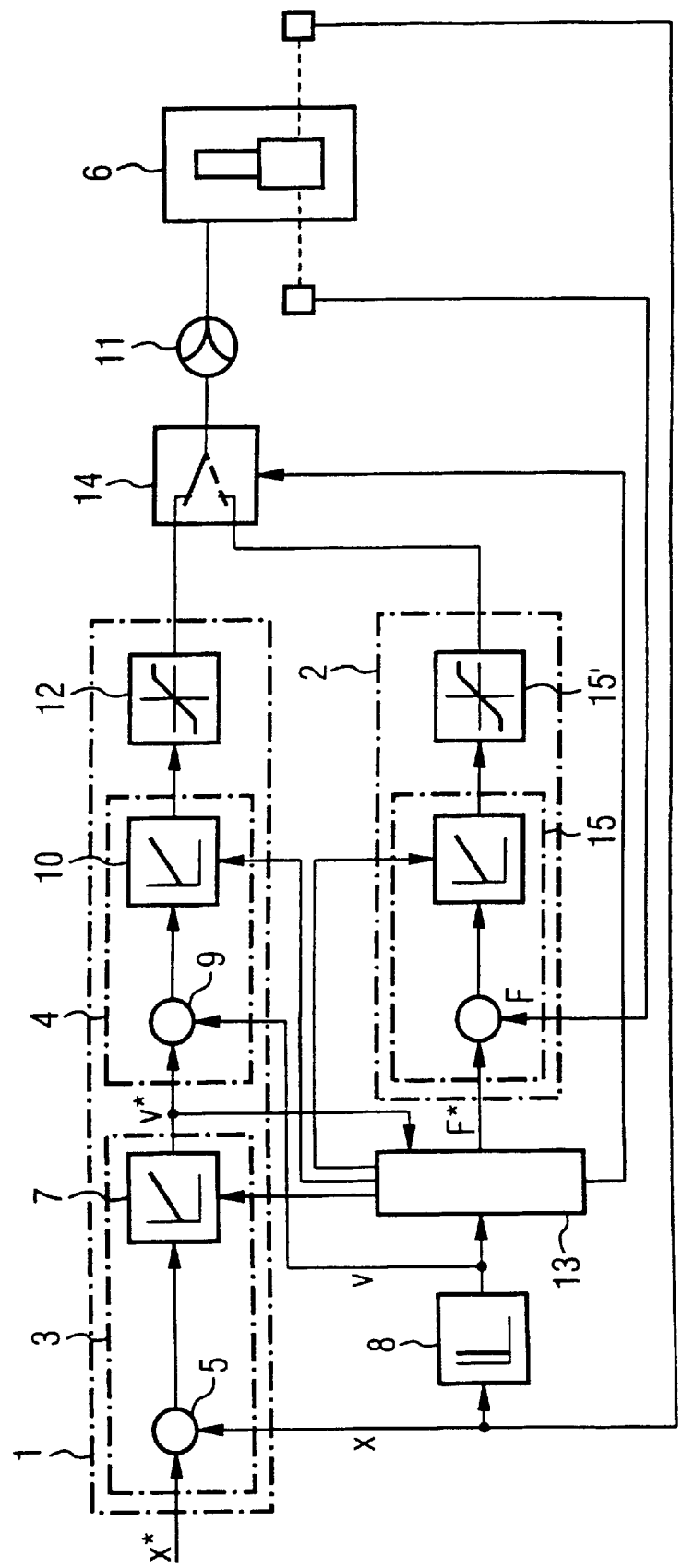
FIG. 1 shows a control device for a hydraulic drive.

In accordance with FIG. 1, a control device for a hydraulic drive has a position control branch 1. A force precontroller 2 is connected in parallel with the position control branch 1. The position control branch 1 has a position controller 3 and a speed controller 4 subordinate to the position controller 3.

At a node point 5, the position controller 3 is prescribed an actual position x of a hydraulic drive 6 and a desired position x* for the hydraulic drive 6. The difference between the desired position x* and the actual position x is formed at the node point 5. The difference is prescribed to a control amplifier 7. The control amplifier 7 determines the absolute value and direction of a desired speed of movement v* from the prescribed difference. The control amplifier 7 therefore serves, inter alia, as a determiner for the desired direction of movement.

The actual position x is also fed to a differentiator 8. The latter differentiates with respect to time the actual position x fed to it in order to determine the actual speed of movement v. The speeds of movement v, v* are prescribed to a node point 9. The difference between speeds of movement v, v* is determined at the node point 9. The difference is fed to a control amplifier 10. The latter uses the fed difference to determine an actuating signal for a control valve 11. The hydraulic drive 6 is then driven via the control valve 11. The control valve 11 can, for example, be constructed as a proportional valve, a servo valve or as a positioning valve.

A characteristic converter 12 can be arranged between the speed controller 4 and the control valve 11 in order to improve the control response. If appropriate, nonlinearities in the drive of the control valve 11 can be compensated by means of the characteristic converter 12.

The drive via the control valve 11 moves the hydraulic drive 6 to an actual position x which, in the ideal case, corresponds exactly to the desired position x*. In accordance with FIG. 1, in this case the hydraulic drive 6 is constructed as a hydraulic cylinder unit. However, it could also be constructed as a hydraulic motor.

The force precontroller 2 is inactive in the case of control, that is to say as long as the hydraulic drive 6 is being moved. However, the force precontroller 2 has a logic circuit 13 which serves, inter alia, as a standstill determiner. The logic circuit 13 is fed the actual speed of movement v. The latter is compared by the logic circuit 13 with a threshold speed vmin. The logic circuit 13 detects standstill when the absolute value of the actual speed of movement v undershoots the threshold speed vmin. The threshold speed vmin is selected in this case in such a way that it slightly exceeds the signal noise of the differentiator 8.

If the logic circuit 13-detects a standstill of the hydraulic drive 6, it initially changes over a switch 14. The position control branch 1 is deactivated thereby, and the force precontroller 2 is activated. A force value F dependent on the desired direction of movement is then applied to the hydraulic drive 6 via a force controller 15.

In accordance with FIG. 1, the position control branch 1 is deactivated during the activation of the force precontroller 2. Alternatively, the position control branch 1 could, however, also remain activated, and the force precontrol could be added to the output signal of the control amplifier 10 or of the characteristic converter 12 via a node point.

Figure 2:
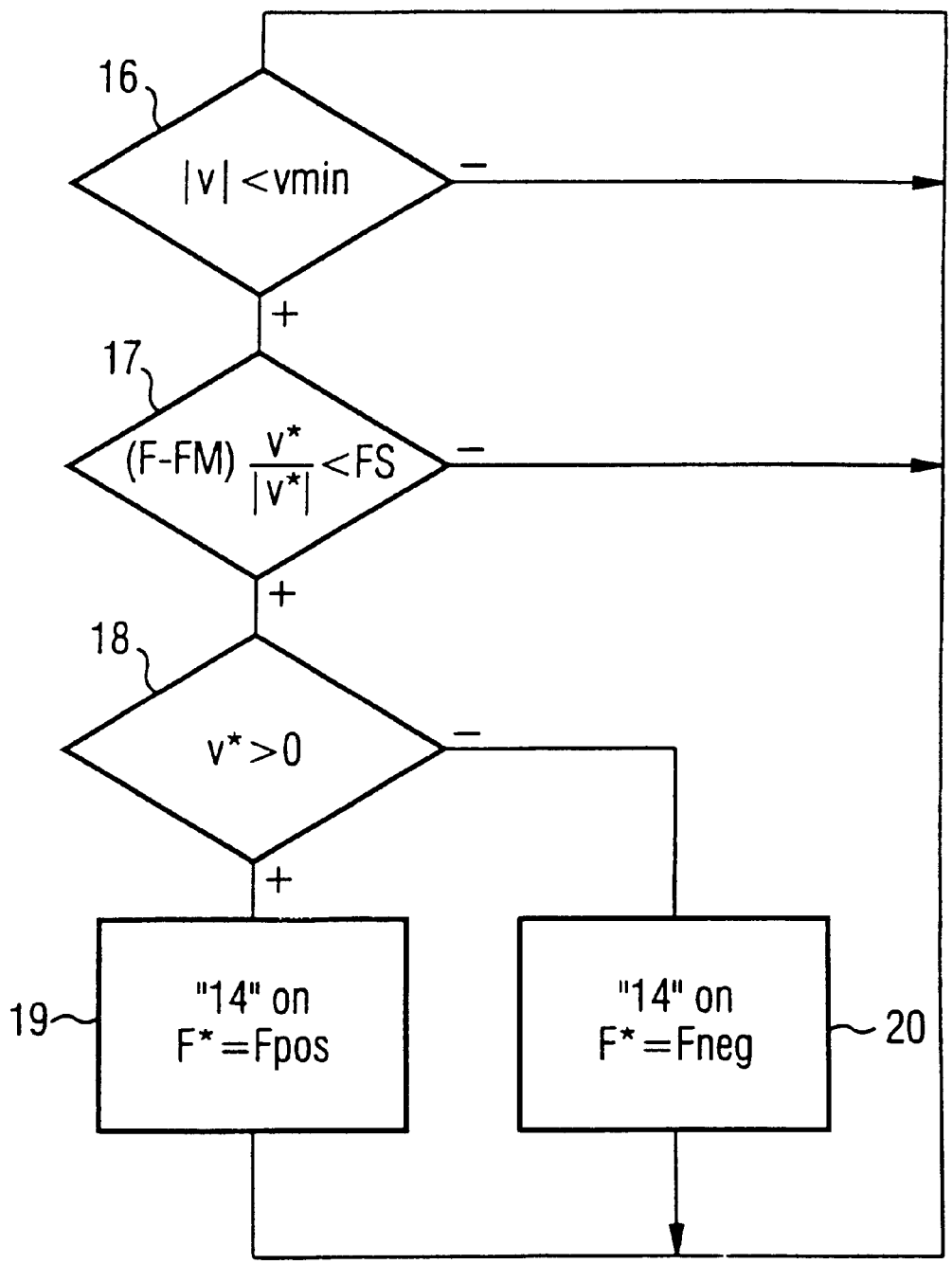
FIG. 2 shows a control method for a hydraulic drive.

In accordance with FIG. 2, it is firstly checked in a step 16 whether the hydraulic drive 6 is at a standstill. The difference between the force value F and an average force value FM is then formed in a step 17. The difference is multiplied by the sign of the desired direction of movement v*. It is then checked whether this product is smaller than a force limit FS.

If one of the two conditions is not fulfilled, the force precontroller 2 remains deactivated. If both conditions are fulfilled, step 18 interrogates whether the desired speed of movement v* has a positive or negative sign. Depending on the result of the decision, in step 19 or 20 the force controller 15 is prescribed as desired force value F* a force Fpos for a positive direction of movement or a force Fneg for a negative direction of movement.

The forces Fpos and Fneg have been determined in advance by moving the hydraulic drive 6 in the positive or negative actual direction of movement v at a constant speed of movement v. The average force value FM is yielded as the average value of the forces Fpos and Fneg.

If the force controller 15 indicates no overshooting response or its output signal is fed to the control valve 11 only during its activation, the force limit FS can be fixed as half the difference between the forces Fpos and Fneg. If, by contrast, the output signal of the force controller 15 is additively added on to the output signal of the position control branch 1, and if the force controller 15 indicates an overshooting response, the force limit FS is preferably selected to be smaller. In this case, the force limit FS is selected in such a way that the output signal of the force controller 15 reaches the respective desired force value F*=Fpos or F*=Fneg at the end of the overshooting process. The risk of overshooting exists, in particular, when the force controller 15 is constructed as a PI controller.

The force controller 15 is also fed the actual position x. The force controller 15 can therefore amplify the difference between the desired force value F* and the force value F as a function of the actual position. This is particularly important when the hydraulic drive 6 is constructed as a hydraulic cylinder unit.

The output signal of the force controller 15 is fed to the switch 14 via a characteristic converter 15'. The latter has the same function for the force precontroller 2 as does the characteristic converter 12 for the position control branch 1.

The controllers 3, 4 of the position control branch 1 can have integral-action components. If they have integral-action components, the latter are preferably reset, but at least held, when the force precontroller 2 is activated. The integral-action component or the integral-action components are therefore at least not increased. In the more favorable case (resetting) they are even set to zero. Conversely, any integral-action component of the force controller 15 is likewise reset or at least held when the force controller 15 is deactivated.

Figure 3:
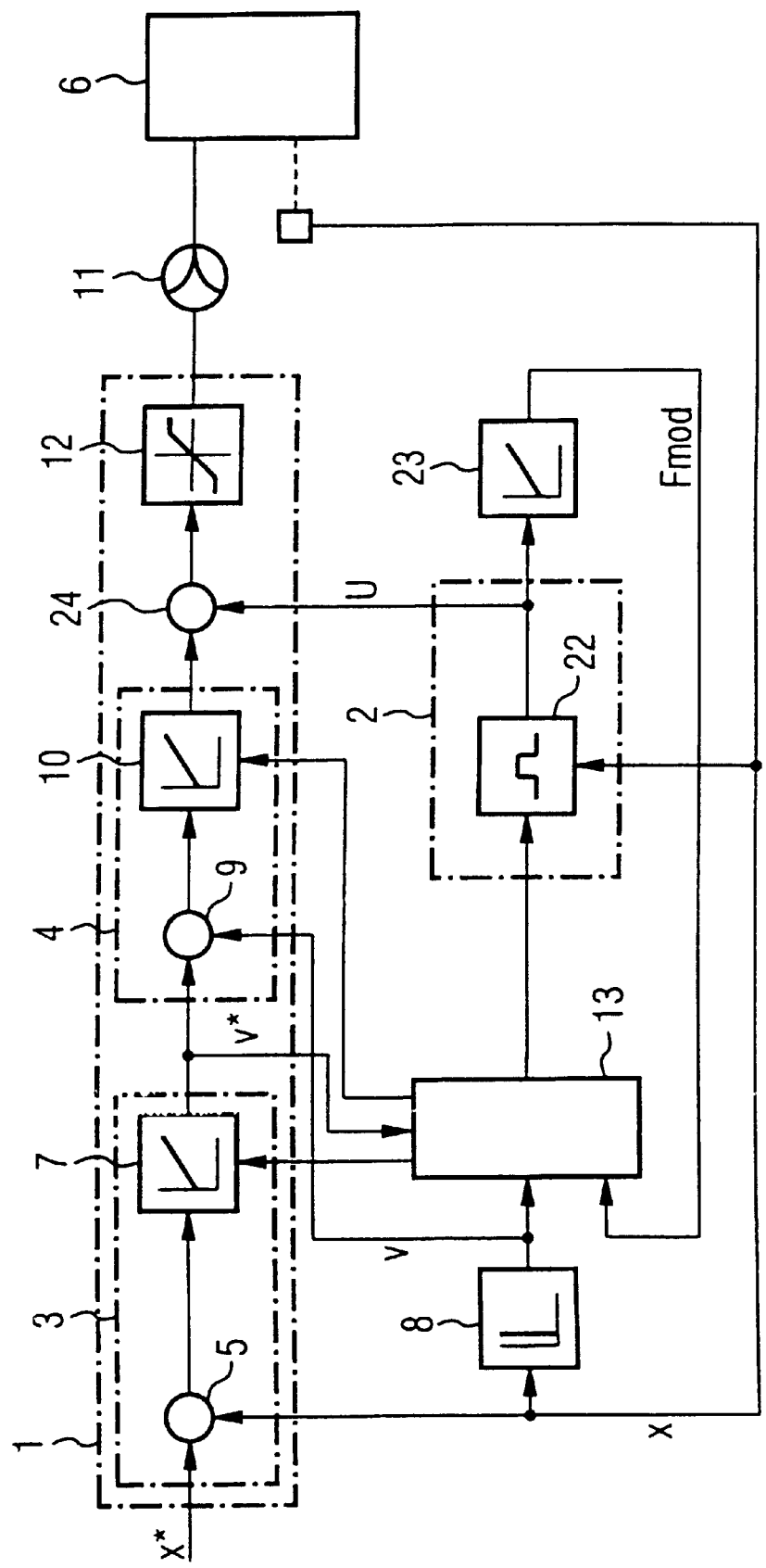
FIG. 3 shows a further control device for a hydraulic drive.

The control device in accordance with FIG. 3 corresponds essentially to the control device in accordance with FIG. 1. Identical elements are provided in this case with identical reference symbols. Consequently, only the differences in relation to FIG. 1 are described below.

By contrast with FIG. 1, the control device in accordance with FIG. 3 has no force controller 15. Instead of this, the force value F is prescribed under control. The force precontroller 2 therefore has a pulse generator 22. The pulse generator 22 applies valve slide desired-position pulses U dependent on the desired direction of movement to the hydraulic drive 6, until the force value F dependent on the desired direction of movement is reached. The actual position x can also be fed to the pulse generator 22. In this case, the pulse generator 22 can determine the valve slide desired-position pulses as a function of the actual position.

A force model 23, which simulates the force value F, is activated during the activation of the force precontroller 2. It is thereby possible to calculate the force value F which is actually not measured.

Furthermore, in accordance with FIG. 3 the position control branch 1 remains activated during the application of the force value F dependent on the direction of movement to the hydraulic drive 6. The output signal of the pulse generator 22 is therefore additively added to the output signal of the speed controller 4. A node point 24 is arranged for this purpose between the speed controller 4 and the characteristic converter 12. The force precontroller 2 therefore requires no dedicated characteristic converter.

Figure 4:
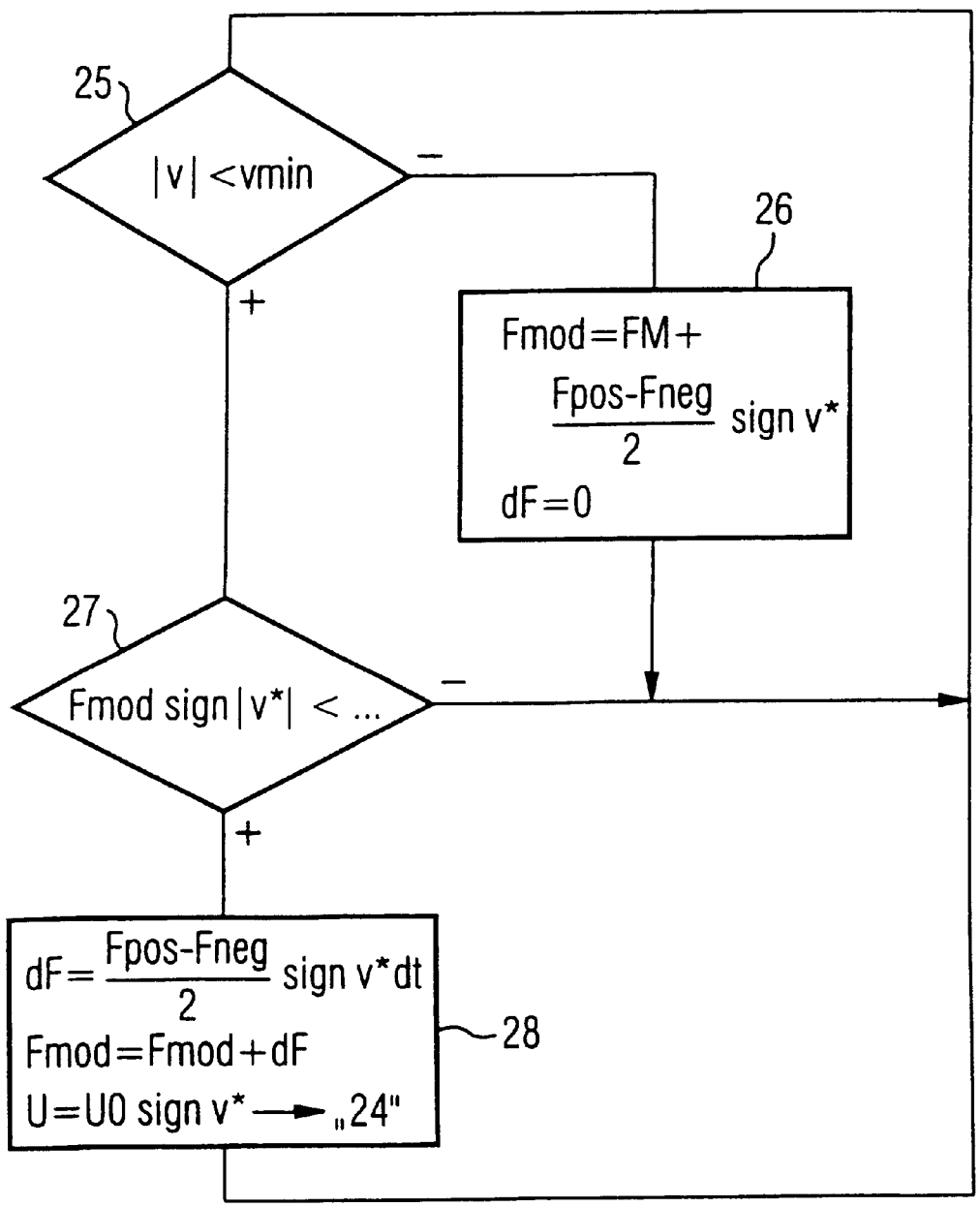
FIG. 4 shows a further control method for a hydraulic drive.

The operation of the control device in accordance with FIG. 3 also essentially corresponds to that of the control device in accordance with FIG. 1:

In accordance with FIG. 4, it is firstly checked in a step 25 whether the hydraulic drive 6 is at a standstill. If the hydraulic drive 6 is not stationary, a model force Fmod is determined in a step 26 as $$Fmod=(Fpos/2+Fneg/2) +(Fpos/2-Fneg/2)signv^*.$$

The forces Fpos and Fneg can have been determined in this case on the basis of earlier measurements or on the basis of calculations. Since the pulse generator 22 outputs valve slider desired-position pulses U dependent on the desired direction of movement, what is decisive is, furthermore, not the absolute values of the forces Fpos and Fneg, but only the difference between the two forces Fpos and Fneg.

If the hydraulic drive 6 is stationary, it is checked in a step whether the condition $$Fmod\ signv^* < (Fpos/2+Fneg/2) +(Fpos/2-Fneg/2)signv^*$$

is fulfilled. Only if this is the case, is a change in force value dF determined in a step 28 as $$dF=(Fpos/2-Fneg/2)signv^*\ dt.$$

In this case, dt is a period during which the pulse generator 22 outputs a valve slide desired-position pulse U. The model force Fmod is then corrected by dF in step 28, and the valve slide desired-position pulse U=U0 signv* is output. In this case, U0 is a pulse height—if appropriate dependent on the actual position.

The present invention has been described for a position-controlled hydraulic drive. However, it is not limited to a position-controlled hydraulic drive. It can likewise also be applied to a speed-controlled hydraulic drive.

What is claimed is:

1. A control method for a hydraulic drive which is moved via a control branch, comprising:
   determining whether the hydraulic drive has come to a standstill; and
   upon detection of the standstill, applying a force value dependent on a desired direction of movement to the hydraulic drive, via a force precontroller connected in parallel with the control branch, as a function of the desired direction of movement.

2. The control method according to claim 1, further comprising:
   prescribing a desired position and an actual position to the control branch;
   moving the hydraulic drive via the control branch under positional control; and
   determining the desired direction of movement as a function of the actual position and the desired position.

3. The control method according to claim 1, wherein the determining step includes comparing an actual speed with a threshold speed, the standstill being detected when an absolute value of the actual speed undershoots the threshold speed.

4. The control method according to claim 1, further comprising:
   deactivating the control branch while the force value dependent on the desired direction of movement is being applied to the hydraulic drive.

5. The control method according to claim 1, wherein the control branch remains activated while the force value dependent on the desired direction of movement is being applied to the hydraulic drive.

6. The control method according to claim 1 wherein the force value dependent on the desired direction of movement is applied to the hydraulic drive via a force controller.

7. The control method according to claim 6, further comprising:
   feeding the actual position to the force controller;
   amplifying, by the force controller, a difference between a desired force value and an actual force value as a function of actual position.

8. The control method as claimed in claim 6, wherein the force controller includes a force controller integral-action component, the control method further comprising:
   when the force controller is deactivated, holding or resetting the force controller integral-action component.

9. The control method according to claim 1, further comprising:
   applying valve slide desired-position pulses dependent on the desired direction of movement to the hydraulic drive via a pulse generator until the force value dependent on the desired direction of movement is reached.

10. The control method according to claim 9, wherein the pulse generator simulates the force value via a force model.

11. The control method according to claim 9, further comprising:
    feeding the actual position to the pulse generator, the pulse generator determining the valve slide desired-position pulses as a function of the actual position.

12. The control method according to claim 1, further comprising:
    determining the force value dependent on the desired direction of movement from a load force and a friction force.

13. The control method according to claim 12, wherein a difference between the force value dependent on the desired direction of movement and the load force is less than the friction force.

14. The control method according to claim 1, wherein the control branch has a control branch integral-action component, and the control method further comprising:
    when the force precontroller is activated, holding or resetting the control branch integral-action component.

15. A control device for a hydraulic drive, comprising:
    a control branch to move the hydraulic drive;
    a standstill determiner to determine a standstill of the hydraulic drive;
    a force precontroller connected in parallel with the control branch receiving an output signal of the standstill determiner and a desired direction of movement, wherein upon detection of the standstill a force value dependent on the desired direction of movement is applied to the hydraulic drive using the force precontroller.

16. The control device according to claim 15, wherein the control branch is prescribed a desired position and an actual position, wherein the control branch is constructed as a position control branch, and wherein the control branch includes a direction-of-movement determiner to determine the desired direction of movement.

17. The control device according to claim 15, wherein the control branch is deactivated while the force value dependent on the desired direction of movement is being applied to the hydraulic drive.

18. The control device according to claim 15, wherein the force precontroller includes a force controller.

19. The control device according to claim 18, wherein the force controller is fed the actual position, and wherein the force controller amplifies a difference between a desired force value and an actual force value as a function of the actual position.

20. The control device according to claim 18, wherein the force controller includes a force controller integral-action component which can be held or reset when the force controller is deactivated.

21. The control device according to claim 15, wherein the force precontroller includes a pulse generator using which valve slide desired-position pulses dependent on the desired direction of movement are applied to the hydraulic drive.

22. The control device according to claim 21, wherein the pulse generator is assigned a force model for simulating the force value.

23. The control device according to claim 21, wherein the actual position is fed to the pulse generator, and wherein the pulse generator determines the valve slide desired-position pulses as a function of the actual position.

24. The control device according to claim 15, wherein the control branch includes a control branch integral-action component which can be held or reset when the force precontroller is activated.

25. The control device according to claim 15, wherein the hydraulic drive is constructed as a hydraulic cylinder unit.

26. The control device according to claim 15, wherein the hydraulic drive is constructed as a hydraulic motor.

* * * * *